United States Patent [19]

Zdrok

[11] Patent Number: 5,373,869
[45] Date of Patent: Dec. 20, 1994

[54] TEST PROBE FOR FACE PIECE RESPIRATORS

[75] Inventor: Joseph Z. Zdrok, Webster, Mass.

[73] Assignee: Cabot Safety Corporation, Southbridge, Mass.

[21] Appl. No.: 11,850

[22] Filed: Jan. 29, 1993

Related U.S. Application Data

[63] Continuation of Ser. No. 676,835, Mar. 28, 1991, abandoned.

[51] Int. Cl.$^5$ .................... F16L 55/10; A61M 15/00
[52] U.S. Cl. .................... 138/90; 138/89; 138/94; 128/202.13
[58] Field of Search ............ 138/89, 90, 96 R; 128/202.27; 73/40.5 R, 49.1, 49.2, 49.5, 49.8; 285/177, 176, 901, 174, 390, 27, 24, 18

[56] References Cited

U.S. PATENT DOCUMENTS

| | | | |
|---|---|---|---|
| 449,169 | 3/1891 | O'Brien | 138/90 |
| 731,348 | 6/1903 | Eshelman | 285/177 |
| 789,683 | 5/1905 | Campbell | 138/90 |
| 922,544 | 5/1909 | Turner | 285/177 |
| 1,007,644 | 10/1911 | Cocke | 128/202.13 |
| 1,107,471 | 8/1914 | Yerkes | 285/177 |
| 1,476,969 | 12/1923 | Howard | 285/177 |
| 2,425,817 | 8/1947 | Mosca | 285/177 |
| 2,836,437 | 5/1958 | Wayman | 285/158 |
| 2,920,178 | 1/1960 | Schossow | 128/202.13 |
| 2,921,599 | 1/1960 | Fleischman | 285/177 |
| 3,835,852 | 9/1974 | Anderson | 128/202.27 |
| 3,844,313 | 10/1974 | Arnold | 138/90 |
| 4,044,798 | 8/1977 | Feldstein et al. | 138/90 |
| 4,045,058 | 8/1977 | Eross | 285/177 |
| 4,111,197 | 9/1978 | Warncke et al. | 128/202.27 |
| 4,378,795 | 4/1983 | Feathers et al. | 128/202.27 |
| 4,602,500 | 7/1986 | Kelly | 138/90 |
| 4,608,975 | 9/1986 | Tannaha | 128/202.13 |
| 4,633,890 | 1/1987 | Carden | 128/202.27 |
| 4,712,594 | 12/1987 | Schneider | 138/149 |
| 4,739,523 | 4/1988 | Bondar | 285/177 |
| 4,765,325 | 8/1988 | Crutchfield | 128/202.13 |
| 4,852,563 | 8/1989 | Gross | 128/202.27 |
| 4,997,217 | 3/1991 | Kunze | 128/202.27 |

FOREIGN PATENT DOCUMENTS

| | | | |
|---|---|---|---|
| 1201761 | 1/1960 | France | 285/177 |
| 2421328 | 10/1979 | France | 128/262.27 |
| 0899300 | 12/1953 | Germany | 285/176 |
| 1028838 | 4/1958 | Germany | 285/177 |
| 630338 | 5/1960 | Italy | 285/177 |
| 0401620 | 5/1966 | Switzerland | 285/177 |
| 0001180 | 1/1901 | United Kingdom | 285/177 |
| 0690053 | 4/1953 | United Kingdom | 285/177 |

*Primary Examiner*—James E. Bryant, III
*Attorney, Agent, or Firm*—Michelle B. Lando

[57] ABSTRACT

A device for fit testing facepiece respirators is presented. In accordance with the present invention, a testing probe is installed in the facepiece of a respirator during fit testing. In a first embodiment, the probe of this invention is installed in the front or side port of the facepiece after the filter element, valve or breathing tube assembly has been removed. The probe comprises a threaded plug adapted for installation into the front port of a respirator and a male hose connector mounted through a hole located at about the center of the plug. In a second embodiment of this invention, a fit testing probe is installed in one of the side or front ports of the facepiece respirator after the exhalation valve or filter element assembly has been removed therefrom. In this latter embodiment, the probe comprises a spool shape plug adapted for installation into the side port. Again, a male hose connector is mounted to the plug through a hole located at about the center of the plug thus providing a probe for fit testing a facepiece.

2 Claims, 4 Drawing Sheets

TEST PROBE FOR FACE PIECE RESPIRATORS

This is a continuation of copending application(s) Ser. No. 07/676,835 filed on Mar. 28, 1991 now abandoned.

BACKGROUND OF THE INVENTION

This invention relates to a device for fit testing respirators, and more particularly to a fit testing probe or respirators.

Fit testing of respirators worn over the face or head (e.g., facepiece type respirators) are well known. During such fit testing, the facepiece or lens of a respirator is pierced or drilled to provide a hole. Thereafter, a probe (generally comprising a male hose connector) is inserted into the hole and thus provides access for fit testing of the respirator. The facepiece is then fit tested.

Conventional fit testing procedures suffer From several drawbacks and deficiencies. For example, the respirator, if worn, must be removed to be pierced or drilled prior to the fit test. In addition, this pierced or drilled hole generally renders the Facepiece useless For purposes other than fit testing. In other words, once the Fit testing procedure has taken place, the Facepiece can no longer be used for its intended purpose and must be discarded due to the destructive nature of the fit testing procedure.

SUMMARY OF THE INVENTION

The above-discussed and other problems and deficiencies of the prior art are overcome or alleviated by the new and improved device for fit testing facepiece respirators of the present invention. In accordance with the present invention, a testing probe is installed in the facepiece of a respirator during or prior to fit testing. As is known, respirators typically have a front port for installation of a removable filter element, valve or breathing tube assembly. In addition, such respirators have at least one side port for installation of a removable exhalation valve, filter element or breathing tube assembly. In accordance with the present invention, the fit testing probe is removably installed either in the front port or in the side port of the respirator.

In a first embodiment, the probe of this invention is installed in the front or side port of the facepiece after the filter element, exhalation valve or breathing tube assembly has been removed. The probe comprises a threaded plug adapted for installation into the front port having a male hose connector mounted through a hole located at about the center of the plug.

In a second embodiment of this invention, a fit testing probe is installed in one of the side or front ports of the facepiece after the exhalation valve, filter element or breathing tube assembly has been removed. In this latter embodiment, the probe comprises a spool shape plug adapted for installation into the side or front port. Again, a male hose connector is mounted to the plug through a hole located at about the center of the plug thus providing a probe for fit testing a facepiece.

The present invention eliminates the need of prior art fit testing procedures for piercing or drilling of the facepiece or lens to insert a probe. Further, the present invention does not require removal of the facepiece from the wearer to install the probe. In addition, the present invention does not destroy the facepiece as did the prior art when conducting a fit test. After a fit test with the probe of the present invention, the facepiece can be again used for protective wear leading to less waste and a cost savings.

The above-discussed and other features and advantages of the present invention will be appreciated and understood by those of ordinary skill in the art from the following detailed description and drawings.

BRIEF DESCRIPTION OF THE DRAWINGS

Referring now to the drawings wherein like elements are numbered alike in the several FIGURES.

DESCRIPTION OF THE PREFERRED EMBODIMENT

Figure 1:
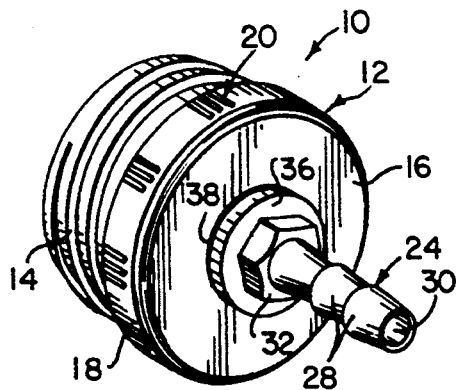
FIG. 1 is a front perspective view of a fit testing probe in accordance with a first embodiment of the present invention.
Figure 2:
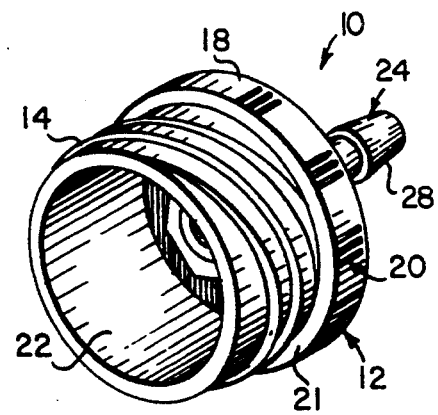
FIG. 2 is a rear perspective view of the fit testing probe of FIG. 1.
Figure 3:
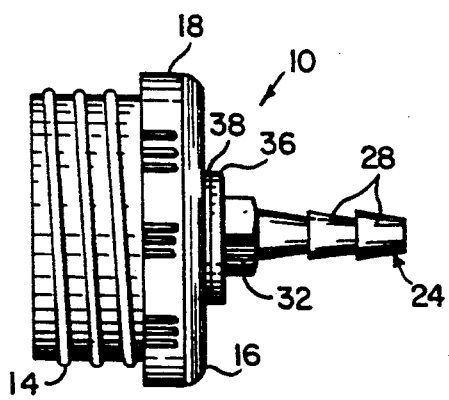
FIG. 3 is a side elevation view of the fit testing probe of FIG. 1.

Referring now to FIGS. 1 through 6, a fit testing probe in accordance with the present invention and for use with a facepiece type respirator is shown generally at 10. Probe 10 includes a cylindrically shaped plug 12. Plug 12 has a threaded surface 14 to provide means for mounting probe 10 to a facepiece (as shown in FIG. 7). Plug 12 is enclosed at one end by an annular surface 16. A rim 18 having a plurality of ridges 20 for gripping is circumferentially disposed about annular surface 16. Rim 18 (and surface 16) have a larger diameter than plug 12 with a lip 21 being defined between rim 18 and plug 12. The other end of plug 12 is open defining a cavity 22 therein.

Figure 4:
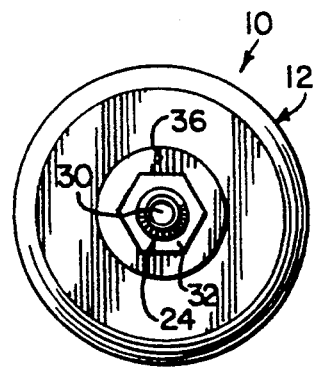
FIG. 4 is a front elevation view of the fit testing probe of FIG. 1.
Figure 5:
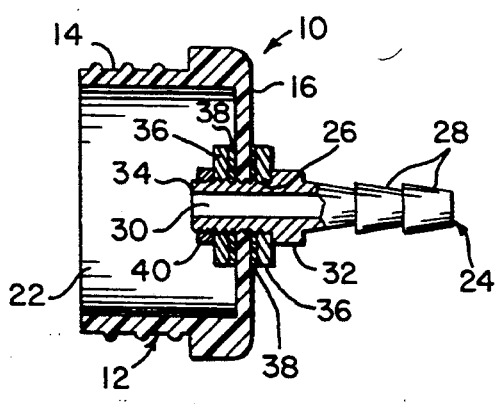
FIG. 5 is a partially cut away view of the fit testing probe of FIG. 1.
Figure 6:
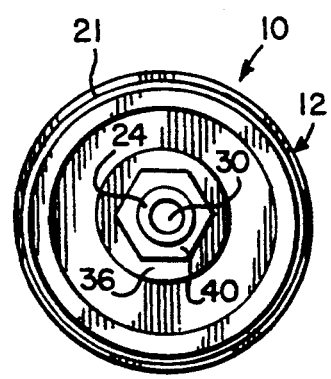
FIG. 6 is a rear elevation view of the fit testing probe of FIG. 1.
Figure 7:
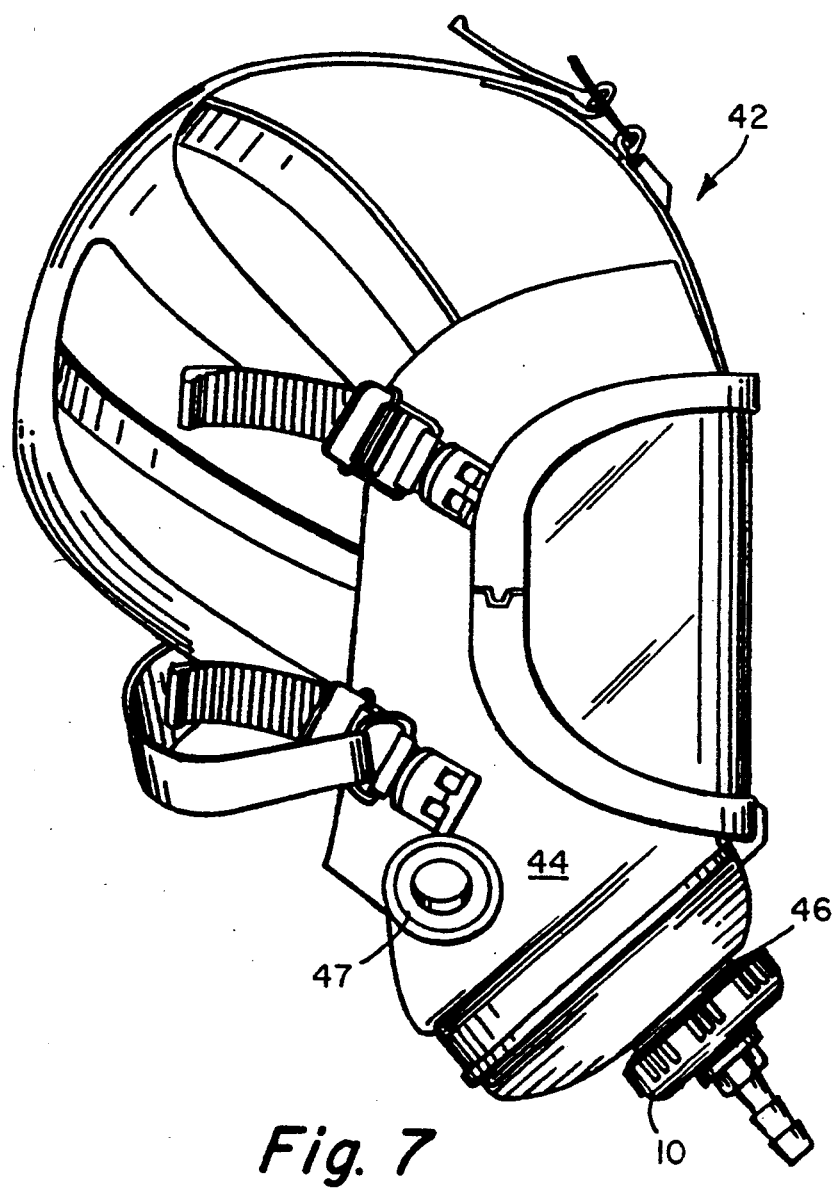
FIG. 7 is a perspective view of a respirator having the fit testing probe of FIG. 1 installed therein.

Still referring to FIGS. 1–6, a male hose connector 24 is connected through a hole 26 at about the center of surface 16. Connector 24 may be comprised of any suitable metal (e.g., brass) or plastic. Connector 24 has at one end a plurality of adjacent conical or tapered surfaces 28 for accepting a hose (not shown) of the type commonly employed when fit testing a facepiece. An interior passage 30 within connector 24 provides access for fit testing. Referring to FIGS. 4 and 6, a hexagonal protrusion 32 extends outwardly from the base of the tapered surfaces 28. Connector 24 terminates at one end at a threaded surface 34 to provide means for retaining connector 24 to plug 12. Connector 24 is retained on plug 12 by a pair of spaced washers 36, a pair of gaskets 38 disposed between washers 36 and plug 12 to provide an air tight seal, and a hexagonal nut 40 which is threaded onto threaded surface 34. Gaskets 38 are preferably a known neoprene gasket. Washers 36 and nut 40 are preferably brass or other suitable metal or plastic.

Referring now to FIG. 7, a known respirator is shown generally at 42. Respirator 42 has a facepiece 44 including a threaded front port 46 for installation of a removable filter element, exhalation valve or breathing tube assembly. Probe 10 is secured within port 46 by threaded surface 14 (FIG. 1). It will be appreciated that the filter element, exhalation valve or breathing tube assembly is removed prior to the installation of probe 10. It will be appreciated that probe 10 is only installed for the purpose of conducting tests on the facepiece 44; and would be removed (and replaced by the removable filter element, exhalation valve or breathing tube assembly) subsequent to testing. While test probe 10 has been shown being threadably and detachably connected to front port 46, it will be appreciated that probe 10 may also be connected to either one of the side ports 47 (so long as side port 47 has internal threading).

Figure 8:
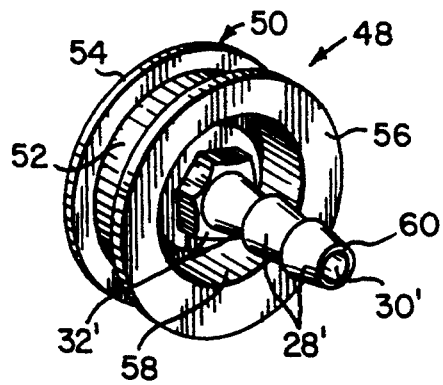
FIG. 8 is a front perspective view of a fit testing probe in accordance with a second embodiment of the present invention.
Figure 9:
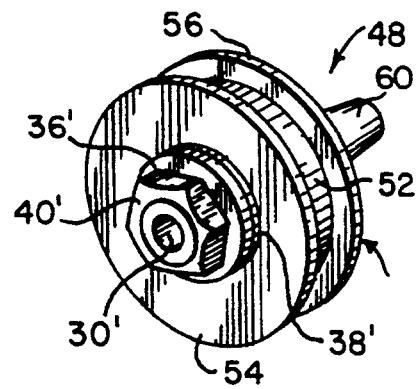
FIG. 9 is a rear perspective view of the fit testing probe of FIG. 8.

Referring now to FIGS. 8 and 9, a second embodiment of a fit testing probe in accordance with the present invention is shown. Probe 48 includes a plug 50 having a generally cylindrical shape. Plug 50 includes a recessed cylindrical surface 52 sufficient in width for mounting probe 48 to a facepiece (see FIG. 14). Recessed surface 52 is sandwiched between a pair of larger diameter surfaces including rear circular surface 54 which encloses one end of plug 50 and front annular surface or rim 56. Rim 56 is affixed to the other end of plug 50 to define an interior cavity 58. The diameters of surfaces 54 and 56 are substantially equivalent.

Figure 10:
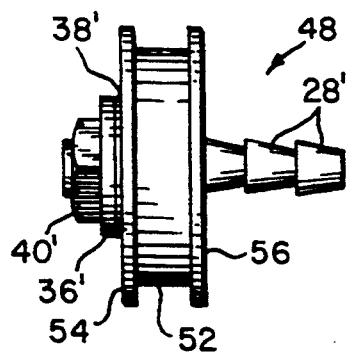
FIG. 10 is a side elevation view of the fit testing probe of FIG. 8.
Figure 11:
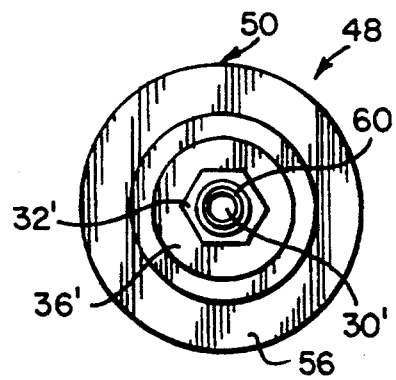
FIG. 11 is a front elevation view of the fit testing probe of FIG. 8.
Figure 12:
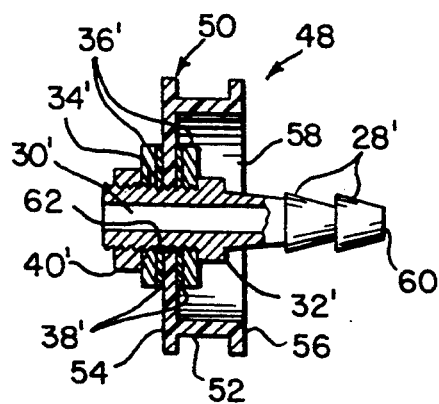
FIG. 12 is a partially cut away view of the fit testing probe of FIG. 8.
Figure 13:
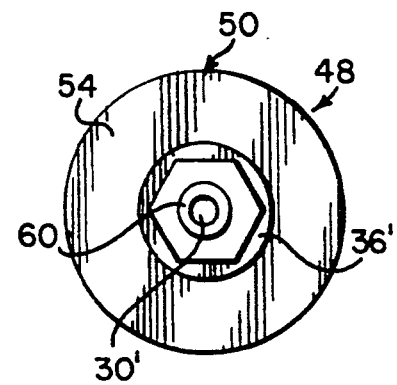
FIG. 13 is a rear elevation view of the fit testing probe of FIG. 8.

Referring now to FIGS. 8, 10, and 12, a male hose connector 60 is connected through a hole 62 at about the center of surface 54. Connector 60 is identical to previously described connector 24 and therefore the same reference numbers (with the addition of a prime) are used to identify corresponding structure.

Figure 14:
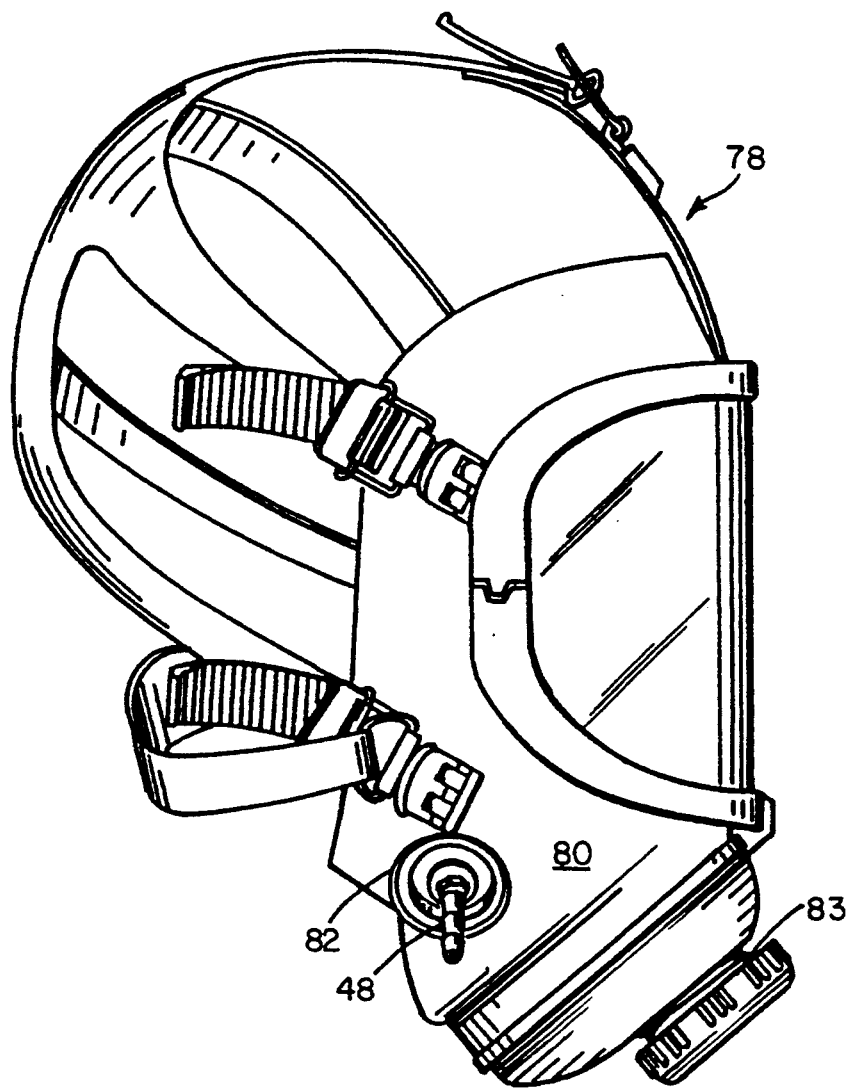
FIG. 14 is a perspective view of a respirator having the fit testing probe of FIG. 8 installed therein.

Referring now to FIG. 14, a known respirator is shown generally at 78. Respirator 78 has a facepiece 80 including at least one side port 82 for installation of a filter element, breathing tube assembly or an exhalation valve (not shown). In accordance with this invention, probe 48 is snapped into port 82 with the wall of the facepiece being secured in the space defined between surface 54 (FIG. 10) and rim 56. It will be appreciated that the filter element, breathing tube assembly or exhalation valve is removed prior to the installation of probe 48 and that probe 48 is only installed for the purpose of conducting tests on the facepiece 80. Of course, test probe 48 is removed from facepiece 80 subsequent to testing and replaced with a filter element, breathing tube assembly or exhalation valve for reuse as a protective device. As in the FIG. 7 embodiment, probe 48 may also be employed through the front port 83 in the event that port 83 is of the non-threaded type.

It will be appreciated that while FIGS. 7 and 14 depict a full facepiece respirator, the present invention is also well suited for any other type of respirator such as quarter mask respirators, half mask respirators, helmets and hoods.

While preferred embodiments have been shown and described, various modifications and substitutions may be made thereto without departing from the spirit and scope of the invention. Accordingly, it is to be understood that the present invention has been described by way of illustrations and not limitations.

What is claimed is:

1. In a respirator, comprising:
a facepiece having a front port, and at least one side port, the improvement comprising:
a test probe comprising
a cylindrically shaped plug having a first end and a second end, and a threaded exterior surface for detachably mounting said plug in one of said respirator facepiece ports,
said first end of said test probe having a substantially flat surface with an aperture therethrough, and a rim having a larger diameter than said threaded surface and a plurality of ridges for gripping,
said second end of said test probe having an interior cavity therein, and
a male hose connector mounted through said aperture having a first end including a plurality of tapered surfaces for accepting a hose, and a second end having a threaded surface for securing said connector to said plug.

2. The respirator of claim 1 wherein said test probe aperture is located at the center of said substantially flat surface.

* * * * *